United States Patent
Gilmore

(10) Patent No.: US 8,154,895 B2
(45) Date of Patent: Apr. 10, 2012

(54) METHOD AND APPARATUS FOR DC BUS CAPACITOR PRE-CHARGE

(75) Inventor: Thomas Patrick Gilmore, Wauwatosa, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/701,793

(22) Filed: Feb. 2, 2007

(65) Prior Publication Data

US 2008/0186750 A1    Aug. 7, 2008

(51) Int. Cl.
*H02M 7/155* (2006.01)
*H02M 7/04* (2006.01)

(52) U.S. Cl. .............................. 363/129; 363/87; 363/92

(58) Field of Classification Search .................. 363/129, 363/104, 52–54, 84, 85, 87, 88, 92; 323/901, 323/908, 910
See application file for complete search history.

(56) References Cited

U.S. PATENT DOCUMENTS

| | | | |
|---|---|---|---|
| 3,609,511 A | | 9/1971 | Risberg |
| 4,253,136 A * | | 2/1981 | Nanko ........................ 363/21.02 |
| 5,483,142 A | | 1/1996 | Skibinski et al. |
| 5,694,311 A * | | 12/1997 | Umeda et al. .................... 363/89 |
| 5,808,451 A * | | 9/1998 | Endou et al. ..................... 322/24 |
| 5,850,160 A * | | 12/1998 | Schnetzka et al. ............. 327/438 |
| 6,009,008 A | | 12/1999 | Pelly |
| 6,038,155 A | | 3/2000 | Pelly |
| 6,222,749 B1 | | 4/2001 | Peron |
| 6,239,582 B1 * | | 5/2001 | Buzan et al. ..................... 322/20 |
| 6,493,245 B1 * | | 12/2002 | Phadke ........................... 363/54 |
| 6,617,820 B2 * | | 9/2003 | Carlson et al. ................. 318/727 |
| 6,700,806 B2 * | | 3/2004 | Kolar ............................. 363/89 |
| 6,744,644 B2 | | 6/2004 | Kojori |
| 6,798,166 B2 * | | 9/2004 | Godefroy ...................... 320/104 |
| 7,005,829 B2 | | 2/2006 | Schnetzka |
| 7,035,070 B2 * | | 4/2006 | Shiner et al. ................. 361/91.1 |
| 7,283,377 B2 * | | 10/2007 | Klaassen et al. ................ 363/52 |

* cited by examiner

*Primary Examiner* — Adolf Berhane
*Assistant Examiner* — Emily Pham
(74) *Attorney, Agent, or Firm* — Quarles & Brady LLP; Alexander R. Kuszewski; John M. Miller

(57) ABSTRACT

A method and apparatus for converting three phase AC voltages on first, second and third input lines to DC voltage across positive and negative DC buses, the apparatus comprising a rectifier including first, second and third rectifier legs, each leg including a switch and a diode wherein the switch is linked between the positive DC bus and an cathode of the diode, an anode of the diode is linked to the negative DC rail and the first, second and third diode cathodes are linked to the first, second and third input lines, respectively, a DC bus voltage sensor linked to the positive DC bus and measuring the DC bus voltage to generate a measured DC bus voltage and a rectifier controller that receives the measured DC bus voltage, a reference voltage value and the three phase AC voltages wherein, when the measured DC bus voltage is at least equal to the reference voltage value, the controller turns on the switches in the first, second and third rectifier legs when the voltages on the first, second and third input lines are positive, respectively.

17 Claims, 4 Drawing Sheets

METHOD AND APPARATUS FOR DC BUS CAPACITOR PRE-CHARGE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to DC bus capacitor pre-charging systems and more specifically to a method and apparatus for use in controlling rectification of three phase AC supply voltages to allow pre-charging of a DC bus capacitor prior to full rectifier activity.

A typical power converter includes a rectifier stage and an inverter stage wherein the rectifier stage is provided between three phase AC power lines and a DC bus and the inverter stage is provided between the DC bus and a load. The rectifier, as the label implies, rectifies the three phase AC voltages to generate a DC voltage across the DC bus. The DC bus typically includes a DC bus capacitor that charges as the rectifier operates. The inverter receives the DC voltage and is controlled to change that DC voltage into three phase AC voltages that are provided to the load. Typically the inverter can be controlled to control the frequency and amplitude of the three phase voltages supplied to the load.

Inverters typically include a plurality of switching devices to convert the DC voltage to three phase AC voltages. As known in the power conversion industry, the inverter switches and or a load linked to an inverter can be damaged if they are exposed to excessive currents. One way to protect inverter switches/loads is to provide one or more fuses in the DC bus which open when excessive current passes there through.

When power is initially applied to a converter upon start up, if the DC bus capacitor is uncharged, capacitor appears as a short circuit at the DC bus and therefore, if the three phase AC power is immediately applied to the DC bus, excessive currents can cause the DC bus fuses to blow. For this reason, it is known that, prior to starting full rectification of three phase AC voltages and applying the rectified voltages to the DC bus, the DC bus has to be pre-charged to bring the DC bus potential up to a rated voltage level.

The power conversion industry has developed various ways to pre-charge the DC bus prior to full rectification activity. One way to pre-charge the DC bus is to place a parallel resistor and relay in series with the DC bus capacitor and to short out the resistor by closing the relay after the DC bus potential reaches the rated voltage value. The parallel resistor/relay solution works well with small drives where the cost of the relay and resistor is minimal.

Another way to pre-charge the DC bus prior to full rectification activity is to construct the rectifier stage using silicon controlled rectifiers (SCRs) and to control the turn on times of the SCRs to charge the DC bus over a period and in a controlled manner. The SCR solution works well in large drives where the cost of a relay required to short out the resistor can often exceed the additional costs associated with the SCR switches and a switch controller.

BRIEF SUMMARY OF THE INVENTION

The following presents a simplified summary of the invention in order to provide a basic understanding of some aspects of the invention. This summary is not an extensive overview of the invention. This summary is not intended delineate the scope of the invention and the sole purpose of this summary is to present some concepts of the invention in a simplified form as a prelude to the more detailed description that is presented later.

It has been recognized that a versatile and inexpensive solution to the DC bus capacitor pre-charging problem is to provide a rectifier bridge in conjunction with a pre-charging circuit where the rectifier bridge includes three controllable switching devices in the top halves of three rectifier legs and three diodes in the bottom halves of the three legs where the controllable switches are open while pre-charging is occurring and are closed during positive half cycles of associated line currents after the DC bus capacitor has reached a target pre-charge level (e.g., the rated voltage of the DC bus). In this way the DC bus capacitor can be charged at a rate that should avoid a large startup current and thereafter normal rectifier activity can commence.

In at least some embodiments the three controllable switching devices are silicon controlled rectifiers (SCRs) and the SCRs are controlled to be full on whenever associated phase voltages are positive. In at lease some embodiments a high frequency (e.g., 20 kHz) pulse generator is used to generate firing pulses for the SCRs so that the full on condition can be achieved without requiring components for tracking the phase angles of voltages associated with the SCRs.

The following description and related drawings set forth in detail certain illustrative aspects of the present invention. These aspects are indicative, however, of but a few of the various ways in which the principles of the invention may be employed and the present invention is intended to include all such aspects and their equivalents. Other advantages and novel features of the present invention will become apparent from the following detailed description of the invention when considered in conjunction with the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
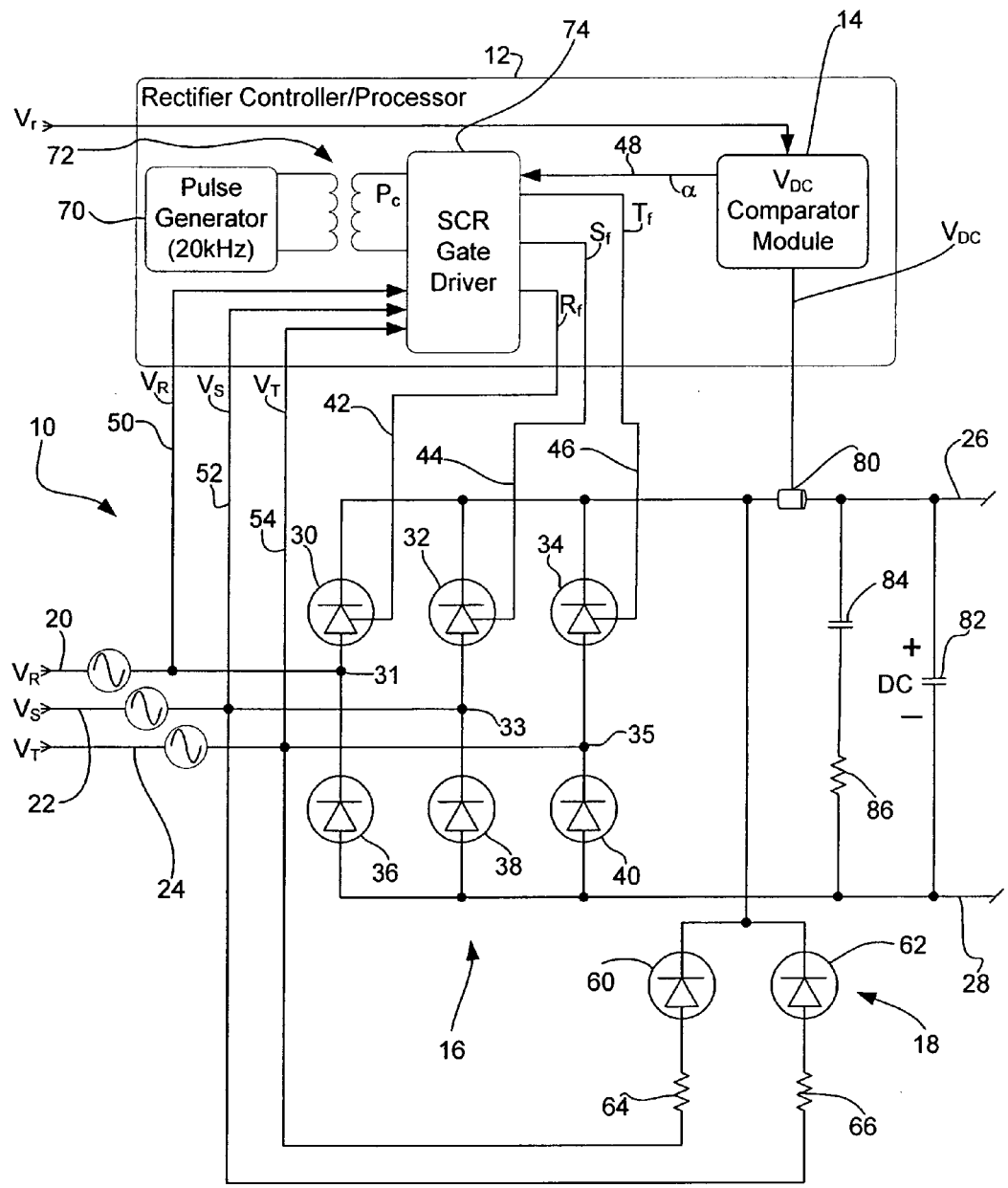
FIG. 1 is a schematic drawing illustrating a rectifier system according to at lease some aspects of the present invention.

One or more specific embodiments of the present invention will be described below. It should be appreciated that in the development of any such actual implementation, as in any engineering or design project, numerous implementation-specific decisions must be made to achieve the developer's specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Referring now to the drawings wherein like reference numerals correspond to similar elements throughout the several views and, more specifically, referring to FIG. 1, the present invention will be described in the context of an exemplary rectifier and control system 10 including, among other components, a rectifier controller/processor 12, a rectifier bridge 16 and a pre-charge circuit 18. The system 10 receives three phase AC voltages $V_R$, $V_S$ and $V_T$ on three input supply lines 20, 22 and 24, respectively, and converts those AC voltages into a DC voltage/potential across positive and negative DC buses 26 and 28, respectively. To this end, rectifier bridge 16 includes first, second and third switches or switching devices which, in the illustrated example, include first, second and third silicon controlled rectifiers (SCRs) 30, 32 and 34, respectively, first, second and third diodes 36, 38 and 40, respectively, a snubber circuit including a capacitor 84 and a resistor 86 and a DC bus capacitor 82. The first SCR 30 and the first diode 36 are linked series between the positive and negative DC buses 26 and 28, respectively. In this regard, the anode of diode 36 is linked to negative DC bus 28, the cathode of SCR 30 is linked to positive DC bus 26 and the cathode of diode 36 is linked to the anode of SCR 30 at a node 31. The R-phase supply line 20 is linked to node 31. Similarly, the anode of second diode 38 is linked to negative DC bus 28, the cathode of second SCR 32 is linked to positive DC bus 26, the cathode of diode 38 is linked to the anode of SCR 32 at a node 33 and the S-phase supply line 22 is linked to node 33. Continuing, the anode of the third diode 40 is linked to negative DC bus 28, the cathode of third SCR 34 is linked to positive DC bus 26, the cathode of diode 40 is linked to the anode of SCR 34 at a node 35 and the T-phase supply line 24 is linked at node 35.

Referring still to FIG. 1, capacitor 84 is linked in series with resistor 86 between positive and negative DC buses 26 and 28. DC bus capacitor 82 is linked between positive and negative DC buses 26 and 28 so as to be in parallel with the series pair including capacitor 84 and resistor 86.

Pre-charge circuit 18 includes first and second pre-charge diodes 60 and 62 and first and second pre-charge resistors 64 and 66, respectively. First pre-charge diode 60 is linked in series with first pre-charge resistor 64 between supply line 24 and positive DC bus 26 where the cathode of diode 60 is linked to positive DC bus 26. Similarly, second pre-charge diode 62 and second pre-charge resistor 66 are linked in series between supply line 22 and positive DC bus 26 with the cathode of diode 62 linked to positive DC bus 26.

Referring yet again to FIG. 1, rectifier controller/processor 12 includes a high frequency pulse generator 70, an isolation transformer 72, an SCR gate driver 74 and a DC voltage comparator module 14. As the label implies, high frequency generator 70 generates a high frequency (e.g., 20 kHz) pulse signal. To this end, see pulse signal $P_c$ in FIG. 3. The high frequency pulse signal is provided to transformer 72 which isolates generator 70 from driver 74.

Figure 3:
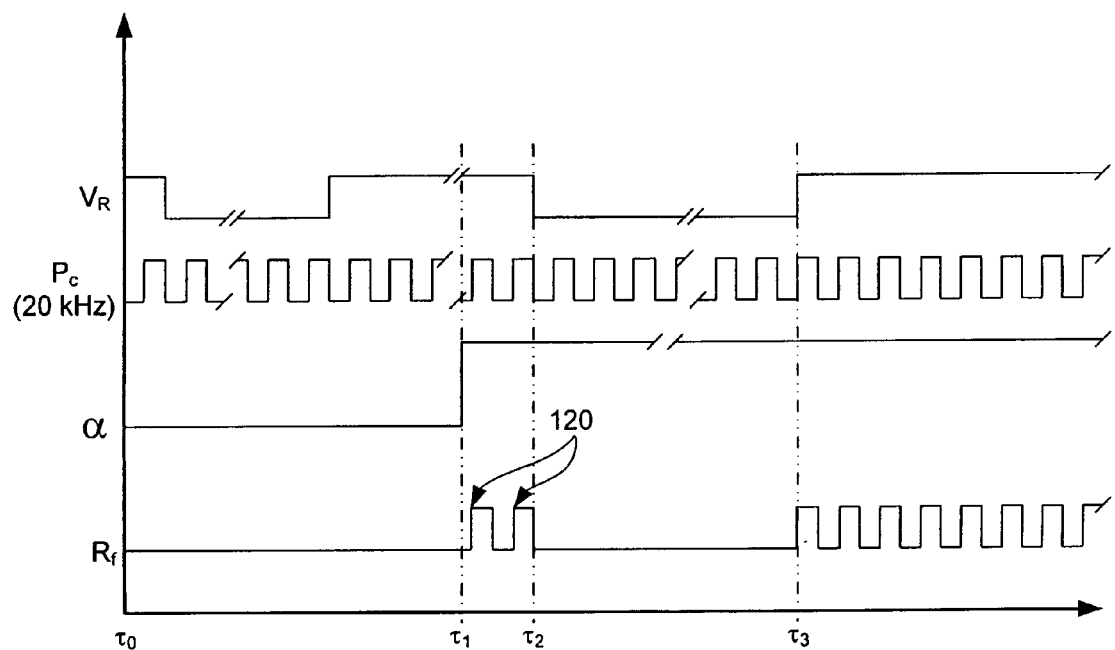
FIG. 3 is a graph illustrating various signals that may be generated by the system as shown in FIG. 1.

Comparator module 14 is linked to a voltage sensor 80 that is in turn linked to positive DC bus 26. Sensor 80 generates a feedback DC voltage value $V_{DC}$ which is provided to comparator module 14. In addition to receiving the feedback DC voltage value $V_{DC}$, module 14 also receives a DC voltage reference value $V_r$ which is input by a system user. The reference value $V_r$ is the rated voltage value for the DC bus. Comparator module 14 compares the feedback DC voltage $V_{DC}$ to the reference or rated value $V_r$ and generates a control signal α on line 48 which is provided to SCR gate driver 74. The control signal α generated by module 14 is low when the feedback DC voltage value $V_{DC}$ is less than the reference voltage value $V_r$. When feedback DC voltage value $V_{DC}$ is equal or greater than reference voltage value $V_r$, control signal α is high. An exemplary control signal α is shown in FIG. 3.

In addition to receiving the high frequency pulse signal $P_c$ and the control signals α, gate driver 74 receives the three phase line voltages $V_R$, $V_S$ and $V_T$ on lines 50, 52 and 54, respectively. Gate driver 74 uses all of the received signals $P_c$, α, $V_r$, $V_S$ and $V_T$ to generate first, second and third firing signals $R_f$, $S_f$ and $T_f$ for controlling SCR switching devices 30, 32 and 34, respectively.

Figure 2:
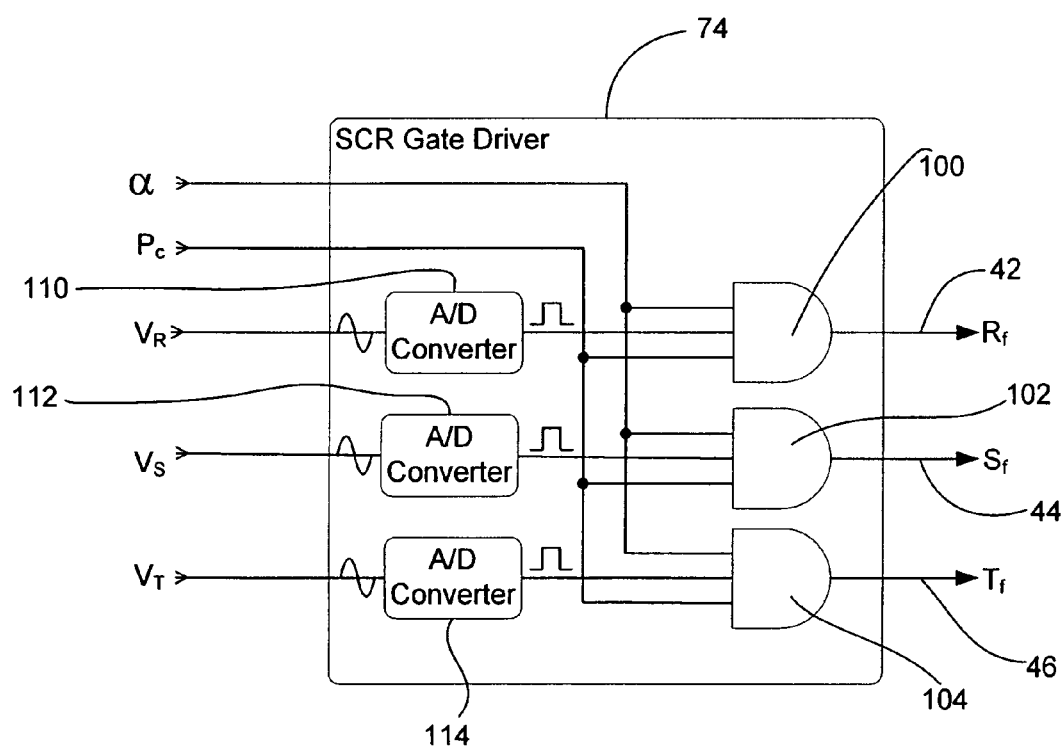
FIG. 2 is a schematic drawing illustrating an exemplary SCR gate driver that may be included as a portion of the system of FIG. 1.

Referring still to FIG. 1 and now also to FIG. 2, SCR gate driver 74 includes first, second and third A/D converters 110, 112 and 114, respectively, and, first, second and third AND gates 100, 102 and 104, respectively. The R-phase input voltage signals $V_R$ is provided to converter 110 which generates an output signal that is low when the R-phase voltage is negative and that is high when the R-phase voltage is positive. Similarly, converters, 112 and 114 receive the S-phase and T-phase input voltages and generate output signals that are high when the associated input voltages are positive and that are low when the associated input voltages are negative.

Each of the control signal α and the high frequency signal $P_c$ is provided to each of AND gates 100, 102 and 104. In addition, AND gate 100 receives the output of first converter 110, AND gate 102 receives the output of second converter 112 and the AND gate 104 receives the output of third converter 114. When all of the inputs to AND gate 100 are high or positive, a firing pulse is generated as signal $R_f$ on line 42. Similarly, when each of the inputs to AND gate 102 are high or positive, a firing pulse is generated as signal $S_f$ on line 44 and when all of the input to AND gate 104 are positive or high, a firing pulse is generated as signal $T_f$ on line 46.

In operation, referring to FIGS. 1, 2 and 3, when three phase voltages $V_R$, $V_S$, and $V_T$ are initially applied to lines 20, 22 and 24, DC bus capacitor 82 is initially uncharged and therefore the feedback DC voltage $V_{DC}$ measured by sensor 80 will have a zero value. When the feedback DC voltage $V_{DC}$ is zero, the control signal a has a low value and therefore, referring specifically to FIG. 2, none of the AND gates 100, 102 or 104 generates firing pulses so that, referring to FIG. 1, SCRs 30, 32 and 34 act as open circuits. In this case, voltage on supply lines 22 and 24 is supplied through resistors 64 and 66 and diodes 60 and 62 to the positive DC bus 26 which starts to pre-charge the DC bus capacitor 82. As DC bus capacitor 82 charges, sensor 80 begins to generate a non-zero DC voltage value $V_{DC}$ which, during a pre-charging period, remains below the reference voltage value $V_r$ and, during this pre-charging period, the control signal α remains low. In FIG. 3, this pre-charging period corresponds to the period between times $\tau_0$ and $\tau_1$ where control signal α is low and the resulting R-phase firing signal $R_f$ does not include firing pulses.

Referring still to FIGS. 1-3, eventually DC bus capacitor 82 charges to the point where the DC bus potential as reflected in the feedback DC voltage $V_{DC}$ exceeds the rated or reference voltage value $V_r$. When the feedback DC voltage $V_{DC}$ exceeds the rated or reference voltage value $V_r$, module 14 generates a high control signal α (see time $\tau_1$ in FIG. 3). When control signal a goes high, during positive half-cycles of the phase voltages $V_R$, $V_S$ and $V_T$, AND gates 100, 102 and 104 generate firing pulses as the firing signals $R_f$, $S_f$ and $T_f$, respectively, for their associated phases. Thus, for instance, referring to FIG. 3, for the R-phase, firing signal $R_f$ includes exemplary firing pulses 120 whenever the R-phase input voltage $V_R$ is high and when the high frequency signals $P_c$ is high once control signal a goes high after time $\tau_1$. As seen in FIG. 3, once the R-phase input voltage $V_R$ goes negative at time $\tau_2$, the R-phase firing pulses stop. Again, at time τ₃ when the R-phase input voltage is positive, the high frequency pulses commence again as signal R_f.

Referring once again to FIG. 1, once SCRs 30, 32 and 34 begin to fire, because the SCRs have very little resistance, the pre-charge circuit 18 is effectively opened (i.e., the pre-charge resistors 64 and 66 essentially limit current flow through circuit 18 to a negligible value).

Figure 4:
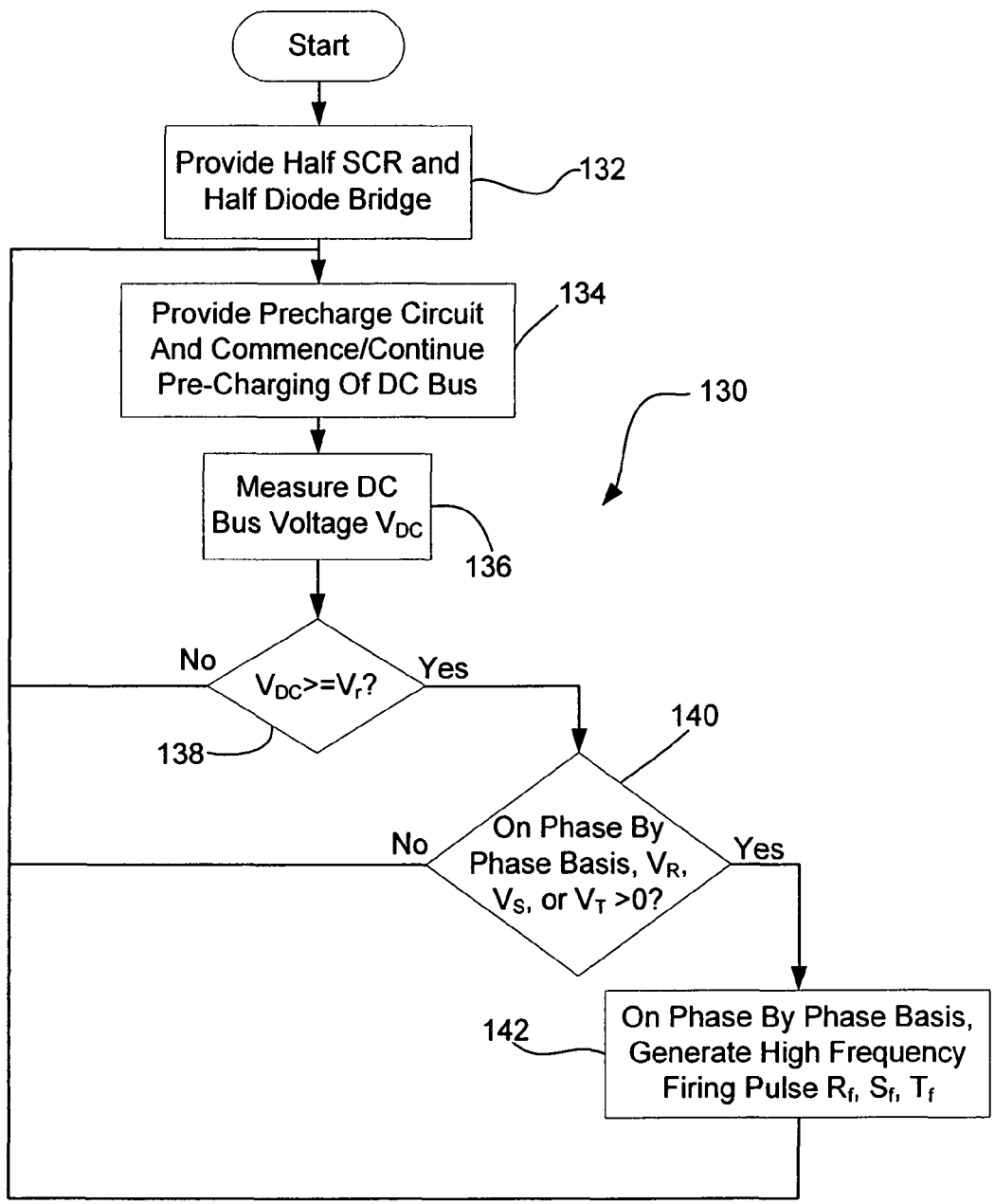
FIG. 4 is a flow chart illustrating an exemplary method according to at least some aspects of the present invention.

Referring now to FIG. 4, an exemplary method 130 consistent with at least some aspects of the present invention is shown that may be performed by the system of FIG. 1. At block 132 a rectifier bridge is provided that includes SCRs that form the top half of the bridge and diodes that form the bottom half of the bridge. At block 134, a pre-charge circuit that maybe akin to the circuit 18 shown in FIG. 1 is provided and is used to commence pre-charging of the DC bus capacitor 82. At block 136 a voltage sensor (e.g., see 80 in FIG. 1) is used to measure the DC bus voltage and at decision block 138 the feedback DC voltage $V_{DC}$ is compared to the reference voltage $V_r$. Where the feedback DC voltage $V_{DC}$ is less than the reference voltage $V_r$, control passes back up to block 134. Where the feedback DC voltage $V_{DC}$ is greater or equal to the reference voltage $V_r$, control passes to block 140. At block 140, on a phase-by-phase basis, where one of the phase voltages $V_R$, $V_S$ or $V_T$ is negative, control passes back up to block 134. However, on a phase-by-phase basis, where one of the phase voltages is positive, control passes to block 142 where, on a phase-by-phase basis, high frequency firing pulses $R_f$, $S_f$ and $T_f$ are generated thereby turning on the associated SCRs 30, 32 and 34, respectively (see again FIG. 1).

It should be appreciated that a system has been described for relatively inexpensively pre-charging a DC bus capacitor using a hybrid SCR-diode rectifier bridge. It should also be appreciated that the system described does not require any type of phase tracking to determine when during positive half cycles of supply line voltages the SCRs should be turned on. Instead, because of the high frequency of the pulse signal $P_c$, a firing pulse is effectively provided immediately when a phase voltage goes positive so that the SCRs are immediately full on whenever associated line voltages are positive.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims for example, while the rectifier is described above as including three SCRs, other embodiments could use other types of switching devices.

To apprise the public of the scope of this invention, the following claims are made:

The invention claimed is:

1. An apparatus for converting three phase AC voltages on first, second and third input lines to DC voltage across positive and negative DC buses, the apparatus comprising:
   a rectifier including first, second and third rectifier legs, each leg including a switch and a diode wherein the switch is linked between the positive DC bus and a cathode of the diode, an anode of the diode is linked to the negative DC rail and the first, second and third diode cathodes are linked to the first, second and third input lines, respectively;
   a DC bus voltage sensor linked to the positive DC bus and measuring the DC bus voltage to generate a measured DC bus voltage;
   a rectifier controller that receives the measured DC bus voltage, a reference voltage value and the three phase AC voltages wherein, when the measured DC bus voltage is at least equal to the reference voltage value, the controller turns on the switches in the first, second and third rectifier legs when the voltages on the first, second and third input lines are positive, respectively, the controller maintaining the switches off in the first, second and third rectifier legs when the measured DC bus voltage is less than the reference voltage value; and
   a pre-charge circuit linking at least one of the input lines to the positive DC bus.

2. The apparatus of claim 1 wherein each of the switches includes a silicon controlled rectifier (SCR) wherein a cathode of each of the SCRs is linked to the positive DC bus.

3. The apparatus of claim 2 wherein, when the measured DC voltage is one of equal to and greater than the reference voltage value, the controller generates high frequency SCR firing signals that are provided to the first, second and third rectifier leg SCRs whenever the voltages on the first, second and third input lines are positive, respectively.

4. The apparatus of claim 3 wherein the controller further including a high frequency pulse generator.

5. The apparatus of claim 1 wherein the pre-charge circuit includes at least one resistor and at least one pre-charge diode.

6. The apparatus of claim 1 wherein the pre-charge circuit includes a pre-charge diode linked in series with a pre-charge resistor between the first input line and the positive DC bus and, wherein, at least one of (1) the cathode of the pre-charge diode is linked to the positive DC bus and (2) the anode of the pre-charge diode is linked to the first input line.

7. The apparatus of claim 6 wherein the pre-charge circuit further includes a second pre-charge diode linked in series with a second pre-charge resistor between the second input line and the positive DC bus and, wherein, one of the cathode of the second pre-charge diode is linked to the positive DC bus and the anode of the second pre-charge diode is linked to the second input line.

8. A system for converting AC voltages on first, second and third input lines to DC voltage across positive and negative DC buses, the system comprising:
   first, second and third switching devices linked between the positive DC bus and the first, second and third input lines, respectively;
   first, second and third diodes linked between the negative DC bus and the first, second and third supply lines, respectively;
   a DC bus voltage sensor linked to the positive DC bus and measuring the DC bus voltage to generate a measured DC bus voltage;
   a processor that receives the measured DC bus voltage and compares the measured DC bus voltage to a voltage reference value and that, when the measured DC bus voltage is one of equal to and greater than the reference value, turns on the first, second and third switches whenever the voltages on the first, second and third input lines are positive, respectively, the processor maintaining the switches off when the measured DC bus voltage is less than the reference voltage value; and
   a pre-charge circuit linking at least one of the input lines to the positive DC bus.

9. The system of claim 8 wherein the switching devices are silicon controlled rectifiers (SCRs).

10. The system of claim 9 wherein each of the diodes and each of the SCRs includes an anode and a cathode, the diode anodes linked to the negative DC bus, the SCR cathodes linked to the positive DC bus, the first diode cathodes and first SCR anodes linked, the second diode cathodes and second SCR anodes linked and the third diode cathodes and third SCR anodes linked.

11. The system of claim 8 wherein the pre-charge circuit includes a first resistor and a first pre-charge diode in parallel with a second resistor and a second pre-charge diode.

12. The system of claim 8 wherein the pre-charge circuit includes a pre-charge diode linked in series with a pre-charge resistor between the first input line and the positive DC bus and, wherein, at least one of (1) the cathode of the pre-charge diode is linked to the positive DC bus and the (2) anode of the pre-charge diode is linked to the first input line.

13. The system of claim 12 wherein the pre-charge circuit further includes a second pre-charge diode linked in series with a second pre-charge resistor between the second input line and the positive DC bus and, wherein, one of the cathode of the second pre-charge diode is linked to the positive DC bus and the anode of the second pre-charge diode is linked to the second input line.

14. A method for converting three phase AC voltages on first, second and third input lines to DC voltage across positive and negative DC buses, the method comprising the steps of:
   providing a rectifier including first, second and third rectifier legs, each leg including a switch and a diode wherein the switch is linked between the positive DC bus and a cathode of the diode, an anode of the diode is linked to the negative DC rail and the first, second and third diode cathodes are linked to the first, second and third input lines, respectively;
   measuring the DC bus voltage to generate a measured DC bus voltage; and
   when the measured DC bus voltage is one of equal to and greater than the reference voltage value, turning on the switches in the first, second and third rectifier legs when the voltages on the first, second and third input lines are positive, respectively;
   when the measured DC bus voltage is less than the reference voltage value, maintaining the switches off in the first, second and third rectifier legs; and
   pre-charging the DC bus prior to turning on the switches.

15. The method of claim 14 wherein the step of providing a rectifier includes providing the rectifier wherein each of the switches includes a silicon controlled rectifier (SCR).

16. The method of claim 15 wherein, when the step of turning on the switches includes generating high frequency SCR firing signals and providing the high frequency signals to the first, second and third rectifier legs.

17. The method of claim 14 wherein the step of pre-charging includes providing a pre-charging circuit including first and second pre-charge diodes linked in series with first and second pre-charge resistors between the first input line and the positive DC bus and the second input line and the positive DC bus, respectively.

* * * * *